J. J. S. O'CONNOR.
HARROW CART.
APPLICATION FILED FEB. 20, 1914.
1,124,321.
Patented Jan. 12, 1915.
2 SHEETS—SHEET 1.
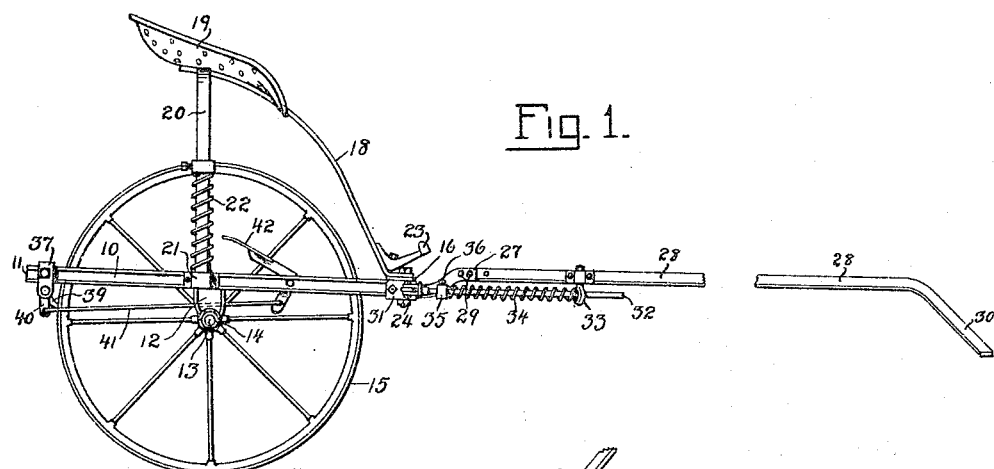
Fig. 1.
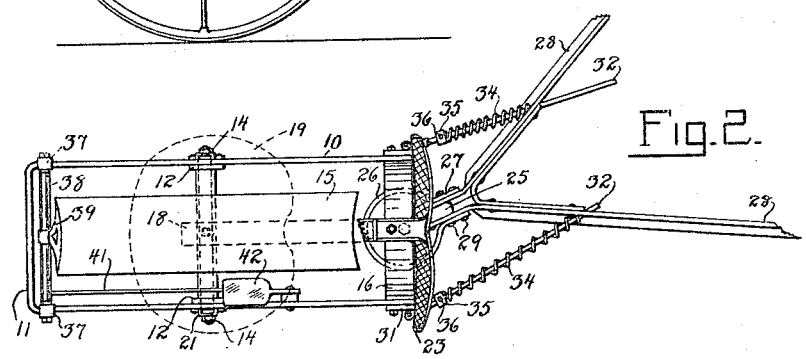
Fig. 2.
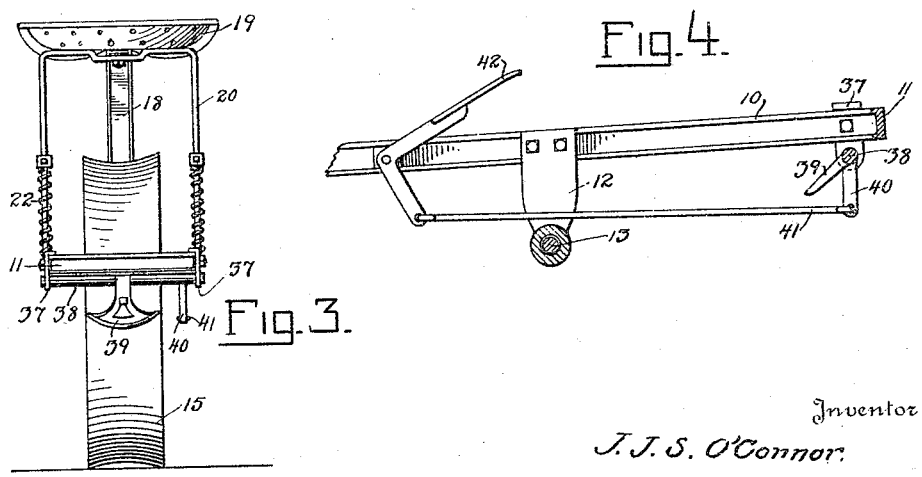
Fig. 4.
Fig. 3.
Witnesses
John F. Hardie, Jr.
L. N. Gillis
Inventor
J. J. S. O'Connor.
By
Attorney

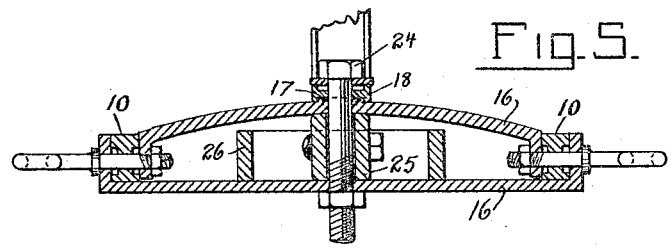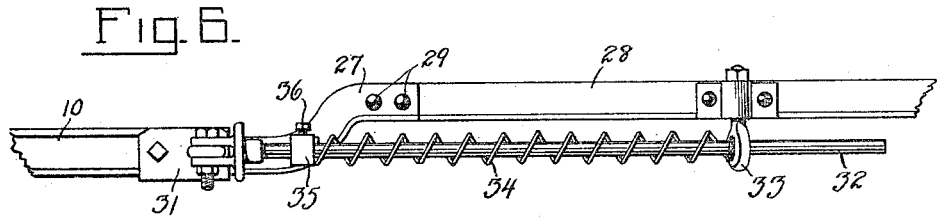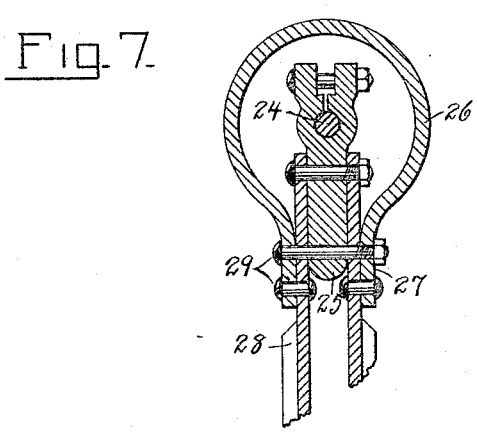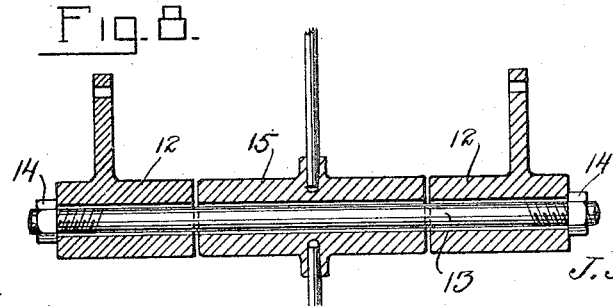

UNITED STATES PATENT OFFICE.

JOSEPH J. S. O'CONNOR, OF BURBANK, SOUTH DAKOTA.

HARROW-CART.

1,124,321. Specification of Letters Patent. Patented Jan. 12, 1915.

Application filed February 20, 1914. Serial No. 820,010.

*To all whom it may concern:*

Be it known that I, JOSEPH J. S. O'CONNOR, a citizen of the United States, residing at Burbank, in the county of Clay, State of South Dakota, have invented certain new and useful Improvements in Harrow-Carts; and I do hereby declare the following to be a full, clear, and exact description of the invention, such as will enable others skilled in the art to which it appertains to make and use the same.

This invention relates to agricultural implements and has special reference to a riding attachment for harrows.

The principal object of the invention is to provide a simple and improved single wheel vehicle which may be readily attached to a harrow and which is provided with a seat for the operator so that the fatigue of walking behind a harrow is eliminated.

A second object of the invention is to provide improved turning means, which will enable the vehicle to follow the path of the harrow without undue strain.

With the above and other objects in view the invention consists in general of certain details of construction and combination of parts hereinafter fully described, illustrated in the accompanying drawings, and specifically claimed.

In the accompanying drawings, like characters of reference indicate like parts in the several views, and:—Figure 1 is a side elevation of the device. Fig. 2 is a plan view thereof. Fig. 3 is a rear elevation thereof. Fig. 4 is a detail section showing the rear scraper and pedal arrangement. Fig. 5 is a detail section taken on the center line of the king bolt. Fig. 6 is a detail showing certain spring arrangements used in connection herewith. Fig. 7 is an enlarged horizontal section through the king bolt showing the turning circle. Fig. 8 is a detail view through the axle.

In the present embodiment of the invention there is provided a frame which consists of the side members 10 and rear member 11. Depending from the side members 10 are the bearing boxes 12 wherethrough passes a shaft 13 having on its ends the nuts 14 so that the shaft can freely revolve in the bearings. Revolubly mounted on the shaft 13 is a wheel 15 which forms the supporting wheel of the vehicle. This wheel is preferably of the type having a concave rim.

Connecting the forward ends of the side members 10 is a bracket 16 the lower member of which is preferably straight while the upper member has a slight camber and is provided centrally with a lug 17 on which fits the lower end of the spring steel seat arm 18. Secured to the upper end of this seat arm is a seat 19 and to this upper end is also secured the brace frame for the seat. This brace frame consists of side members 20 extending down through suitable brackets 21 bolted or otherwise secured to the side members 10 so that as the seat rises and falls these members 20 slide up and down in the brackets. In order to normally hold the seat in raised position and yet permit this rising and falling action these members 20 are surrounded by the spiral springs 22 which bear against suitable collars on the side members and on the top of the brackets 21. Bolted to the lower end of the member 18 is the foot rest 23. Extending through the bracket 16 is the king bolt 24 and on this king bolt is pivoted the arm support 25. Surrounding this arm support is a brace member which consists of a bar having a circular portion 26 and forwardly extending legs 27. The circular portion 26 is concentric with the king bolt and lies between the upper and lower members of the bracket 16 so that it cannot tilt. At 28 are the attaching arms which are preferably formed of angle iron and which are secured to the parts 25 and 27 by means of suitable bolts 29. These attaching arms are bent down at their forward ends as indicated at 30 for the purpose of attaching the harrow thereto.

In order to normally hold the attaching arms in proper position relative to the frame members 10 there is provided at each side of the forward end of the frame a bracket 31 whereto is pivoted a rod 32 the free end of which is slidably mounted in a bracket 33 carried on a respective member 28. On the rod 32 is a spring 34 which bears against the bracket 33 at one end and against a collar 35 mounted on the rod 32 and adjusted thereon to tension the springs equally and hold the parts normally in central alinement. This collar is locked on the rod by the set screw 36. Depending from the rear end of the main frame are brackets 37 wherein is journaled a rock shaft 38 having mounted thereon a scraper 39. This rock shaft is provided with an arm 40 which is connected by means of a link 41 with a pedal lever 42 pivoted to one of the frame members 10, thus the scraper may be placed in contact with the rim of the wheel or allowed to hang free. By this means the device may be used in muddy weather as well as in dry weather.

From the foregoing it will be seen that the device is so arranged that the operator is seated on a spring supported seat. It will also be plain that as the harrow is driven through the field the yielding of the springs 34 on one side or the other will permit the main frame to be drawn along behind the harrow without unpleasant jerking. Furthermore the ring or fifth wheel circle 26 will prevent any tilting of the ground wheels to one side or the other, thus maintaining the harrow frame in an upright position.

There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:

1. In a device of the class described, a main frame, a bracket at the forward end of the main frame, a king bolt passing vertically through said bracket, a pivot member on said king bolt, a fifth wheel member surrounding said pivot member, and arms secured to the pivot member and fifth wheel member and extending forwardly from the frame.

2. In a device of the class described, a main frame, a bracket at the forward end of the main frame, a king bolt passing vertically through said bracket, a pivot member on said king bolt, a fifth wheel member surrounding said pivot member, arms secured to the pivot member and fifth wheel member and extending forwardly from the frame, and yieldable means for holding said arms in alinement with said frame.

3. In a device of the class described, a main frame, arms pivoted to the forward end of the main frame to swing in a horizontal plane, rods each pivoted to a forward corner of the main frame, brackets on said arms receiving the free ends of said rods, collars on said rods, and springs surrounding said rods and bearing against said collars and brackets.

In testimony whereof, I affix my signature, in the presence of two witnesses.

JOSEPH J. S. O'CONNOR.

Witnesses:
E. M. HART,
J. W. WALSH.